(12) United States Patent
Pakkala

(10) Patent No.: US 7,739,407 B1
(45) Date of Patent: Jun. 15, 2010

(54) SYSTEMS FOR CUSTOMIZING BEHAVIORS AND INTERFACES IN SERVICE INVOCATIONS

(75) Inventor: Timo Pakkala, Espoo (FI)

(73) Assignee: Nokia Siemens Networks Oy, Espoo (FI)

(*) Notice: Subject to any disclaimer, the term of this patent is extended or adjusted under 35 U.S.C. 154(b) by 1067 days.

(21) Appl. No.: 09/474,819

(22) Filed: Dec. 29, 1999

(51) Int. Cl.
*G06F 15/16* (2006.01)

(52) U.S. Cl. ...................................... 709/246

(58) Field of Classification Search ................ 709/227, 709/219, 206, 232, 217, 203, 246; 455/461, 455/405; 713/168; 379/93.24; 395/200.57, 395/200.36
See application file for complete search history.

(56) References Cited

U.S. PATENT DOCUMENTS

| | | | |
|---|---|---|---|
| 5,195,181 A * | 3/1993 | Bryant et al. ................ 709/215 |
| 5,603,081 A * | 2/1997 | Raith et al. ............... 455/435.3 |
| 5,742,668 A | 4/1998 | Pepe et al. ..................... 379/58 |
| 5,742,905 A * | 4/1998 | Pepe et al. ................... 455/461 |
| 5,835,724 A | 11/1998 | Smith ..................... 395/200.57 |
| 5,870,549 A | 2/1999 | Bobo, II ................. 395/200.36 |
| 6,144,653 A * | 11/2000 | Persson et al. .............. 370/337 |
| 6,185,288 B1 * | 2/2001 | Wong .......................... 379/219 |
| 6,219,694 B1 | 4/2001 | Lazaridis et al. ............ 709/206 |
| 6,300,947 B1 * | 10/2001 | Kanevsky .................... 715/866 |
| 6,301,471 B1 * | 10/2001 | Dahm et al. ................. 455/405 |
| 6,321,257 B1 * | 11/2001 | Kotola et al. ................ 709/219 |
| 6,336,137 B1 * | 1/2002 | Lee et al. ..................... 709/219 |
| 6,363,419 B1 * | 3/2002 | Martin et al. ................ 709/219 |
| 6,430,624 B1 * | 8/2002 | Jamtgaard et al. ........... 709/246 |
| 6,463,134 B1 * | 10/2002 | Okada et al. ............. 379/93.24 |
| 6,463,534 B1 * | 10/2002 | Geiger et al. ............... 713/168 |
| 6,470,378 B1 | 10/2002 | Tracton et al. |
| 6,658,093 B1 * | 12/2003 | Langseth et al. .......... 379/88.17 |
| 6,661,784 B1 * | 12/2003 | Nykanen ..................... 370/338 |

(Continued)

FOREIGN PATENT DOCUMENTS

EP     0 801 512     10/1997

(Continued)

OTHER PUBLICATIONS

Wallenius et al., Patent Application No. US. 2002/0091797 A1, pages 28.*

(Continued)

*Primary Examiner*—Laurie Ries
*Assistant Examiner*—Chau Nguyen
(74) *Attorney, Agent, or Firm*—Squire, Sanders & Dempsey L.L.P.

(57) ABSTRACT

A system for personalizing and customizing user behaviors and interfaces includes a plurality of terminals for transmitting, processing and receiving information wherein the terminals are configured to each transmit a transmission signal including an identifier (ID) for identifying each of the terminals. The system also includes a network having a plurality of access points operable to communicate with the network, and a Service Enabling server connected to the network wherein each of the plurality of terminals are configured to independently access the Service Enabling server and upon accessing the Service Enabling server, a necessary service requested by the user of the terminal requesting the service is selected. Information related to the service is then placed in an understandable form for the terminal and the user.

44 Claims, 9 Drawing Sheets

U.S. PATENT DOCUMENTS

| | | | |
|---|---|---|---|
| 6,697,372 B1 * | 2/2004 | McAlear | 370/402 |
| 6,735,186 B1 * | 5/2004 | Leppinen | 709/238 |
| 6,771,749 B1 * | 8/2004 | Bansal et al. | 379/88.17 |
| 6,826,597 B1 * | 11/2004 | Lonnroth et al. | 709/207 |
| 6,879,245 B2 * | 4/2005 | Asai et al. | 340/7.55 |

FOREIGN PATENT DOCUMENTS

| | | |
|---|---|---|
| EP | 0959 600 A1 | 11/1999 |
| EP | 0959600 A1 * | 11/1999 |
| WO | WO 97/08906 | 3/1997 |
| WO | WO 98/47090 | 10/1998 |
| WO | WO 99/26159 | 5/1999 |
| WO | WO 00/67436 | 11/2000 |

OTHER PUBLICATIONS

Ahmed Patel, et al. "A technique for multi-network access to multimedia messages" Computer Communications 20 (1997) pp. 324-337.

* cited by examiner

SHOWS THE WEB PAGE THE USER CAN ACCESS THE SERVICE
IN THE INTERNET FOR DIFFERENT TASKS

---

SERVICE ENABLING SERVER'S MAIN PAGE

WEB INTERFACE: HERE YOU CAN FAMILIARIZE YOURSELF WITH THE SERVICES THAT CAN BE ACCESSED FROM YOUR MOBILE PHONE. TO START WITH YOU CAN TRY A HELP COMMAND "HELP". THIS WILL GIVE YOU A LIST OF SERVICES YOU CAN ACCESS. YOU GET FURTHER HELP ON SERVICES BY TYPING "HELP SERVICE 1".

USER PROFILE FIGS. 9-10: PROFILE CONTAINS YOUR PERSONAL INFORMATION. IT ALSO CONTAINS INFORMATION RELATED TO SERVICES YOU ARE SUBSCRIBED TO AND INFORMATION RELATED TO SERVICE CUSTOMIZATION. ALIASES CAN BE SET FOR DIFFERENT SERVICES. INFORMATION RELATED TO THE TYPE OF MOBILE PHONE YOU HOLD IS DEFINED HERE.

CONFIGURE EMAIL FIGS 7-8: CONFIGURE SERVICE ENABLING E-MAIL SERVICE TO ACCESS YOUR EMAIL ACCOUNT. HAVE YOUR PHONE WITH YOU BEFORE YOU TRY TO CONFIGURE THE EMAIL SERVICE.

FEEDBACK: USER THIS TO SEND US ANY FEEDBACK YOU HAVE COMMENTS, SUGGESTIONS, COMPLAINTS, SERVICES YOU BE INTERESTED IN.

THE LIST OF EMAILS YOU WILL GET BY THE COMMAND MAIL b, THE TERMINAL (EITHER YOU PC OR MOBILE PHONE ETC.) WILL INFORM YOU THE AVAILABLE MAIL HEADER AND SENDER SO THAT THE FIELDS OF THE MESSAGE MEET THE LIMITATIONS MADE IN THE FIELDS:

| MAIL b |     SEND

RECEIVE THE MESSAGE

```
1. STEWART JOE: FW: CHEAPEST
2. EXT HANNULA EERO: RE: 222211
3. STEWART HANS: RE: MEETING
4. MALONY HENRY: RE: CHANGE OF ME
5. JOHANSSON A: QUESTION?
```

*FIG.7*

THE EMAIL OF NUMBER 1 IS ASKED TO SEE, THE ANSWER WILL HAVE THE FOLLOWING MESSAGE, AGAIN THE TERMINAL MAY LIMIT THE SIZE OF THE MESSAGE SO THAT YOU WILL ONLY SEE FIRST WORDS OF THE MESSAGE WHICH E.G. IN SMS SERVICE WILL INCLUDE ONLY 160 CHARACTERS. THE OTHER COMMAND IS NEEDED TO GET FURTHER INFORMATION, E.G. USING COMMAND " "

| MAIL b 1 | SEND |

RECEIVE THE MESSAGE

```
ARI

YOU WILL FIND THE CHEAPEST AND BEST CARS FROM THE NEW CAR
SHOP OPENED IN THE VIRGINIA IN U.S.

JOE

-----ORIGINAL MESSAGE-----
FROM: AMOLD ARI (KOVA/ESPOO)
SENT: 23.SEPTEMBER1999 14:32
TO: STEWART JOE (N/HELSINKI)
SUBJECT: CHEAPEST CARS IN WORLD
IMPORTANCE: HIGH

WHERE IS THE NEWEST CAR SHOP LOCATED?

ARI
```

*FIG. 8*

USER INFORMATION IN THE SERVICE ENABLING SERVER

```
NAME:
 FIRST NAME         STEWART
 MIDDLE NAME
 LAST NAME          JOE
ADDRESS:
 STREET:
 CITY:
 POSTAL CODE:
 COUNTRY:
JOB TITLE: BUSINESS MAN
DEPARTMENT
DATE OF BIRTH: ( DAY ) : ( MONTH ) : ( YEAR )
 TERMINAL DETAILS
 1.TYPE: NOKIA 3110
   CHANNELS:       SMS
   ADDRESS: +358402222
   STATUS: ON
ALIAS SETTINGS
 NAME           VALUE
 PUH            PUNAATTORT.NPB
 LIST           JUMP.SERVICES
 ?              JUMP.HELP
SUBSCRIBED SERVICE PATH
 1.TOOLS(CUSTOMISE)
 2.JUMP(CUSTOMISE)
```

*FIG. 9*

SERVICE ENABLING SERVER'S STRUCTURE CONT.

SERVICE PERSONALIZATION DATA
  JUMP.MAIL

MAIL.USER: "NMP\STEWART"
    JUMP.MAIL.PASSWORD: "BAEACH3BACDA77DA6FCE55BLLLKB45"
    MAIL.FROM: "JOE.STEWART@JUMP.COM"
    JUMP.MAIL.NAME: "JOE STEWART"
    MAIL.HOST: "ASIS489NO.PPC.COM"
    MAIL.SMTP.HOST: "HOL.ITNV.JUMP.COM"
    JUMP.MAIL.DEFAULTFOLDER: "INBOX"

COMMMAND COMPLETION PARAMETERS

1. PREFIX MODE: ON
  2. KEY EXPANSION: ON
  3. CASE SENSITIVE: OFF*
  4. PRIMARY LIST: ALIASES
  5. ALIASES MATCH: ON
  6. SERVICES MATCH: ON
  7: UNIQUE MATCH: ON

*FIG. 10*

SYSTEMS FOR CUSTOMIZING BEHAVIORS AND INTERFACES IN SERVICE INVOCATIONS

BACKGROUND OF THE INVENTION

1. Field of the Invention

This invention relates generally to service provision in electronic networks and, more particularly to customizing behaviors and interfaces in service invocations via electronic networks.

2. Description of the Related Art

The rapid growth of both the Internet and wide-area wireless networks has created a huge opportunity for offering new innovative data services to an unprecedented number of end-users. Mobile clients as access devices have both limitations and advantages compared to standard desk-top PCs with a browser. Therefore, special functionality is needed on the server-side to take advantage of the strengths of mobile clients on the one hand, and to overcome the limitations of these low-end access devices on the other hand and provide the new services.

A common problem facing electronic network users is the lack of universal access to services. The reason for this problem varies, generally according to the incompatibility of a user's device and a service's network. Another common problem faced by electronic network service providers is the lack of the ability to combine and modify services from the same provider or from plurality of providers. Also, there is an inability today to provide general and secure information about the personalization of users, and the customization of the implementation platform both on the terminal and server sides. Furthermore, the new systems like WAP (Wireless Application Protocol) need new phones for reaching the services. Therefore, there is a need to provide the user with a mobile terminal to access different kinds of services with and different standards.

SUMMARY OF THE INVENTION

The present invention provides a system and a method for personalizing and customizing behaviors and interfaces in service invocation and provision via electronic networks. A special application server is provided through the Internet which represents an electronic utilization of a terminal and service functionality. The system supports a wide range of specified terminals and creates personal and customized data about the user, terminal, interfaces and services. The system sets behaviors according to the preferences of a user, as well as the terminals, interfaces and services to be utilized and implemented by the user. In preferred embodiments, the personal information is, for example, contact information, the user's schedule, personalized parameters of various services, and a unique set of services provided to the terminal user. In still further preferred embodiments, the accessed and secured information is used to personalize the user. Alternatively, the services are a service provider's service sets and a customized service for the user. In still more preferable, a user's terminal and a terminal gateway to a special application server are controlled according to technical capabilities of the terminal and the gateway interface to the server.

The present invention provides special functionality on the server side to take advantage of the strengths of mobile clients and overcome the limitations of low-end access devices. Moreover, the invention provides universal access to services and the ability to combine and modify services from the same provider or providers. Additionally, the present invention provides secure customization of the implementation platform on the terminal and server sides.

As a result of this invention, users are able to get WAP services with phones that do not support WAP services. Thus, a service provider will receive many more clients to service, and an existing system can be used to provide services which previously have been provided only for new terminals.

These and other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

The disclosed invention will be described with reference to the accompanying drawings, wherein:

FIG. 6 illustrates a web page that a user can access to obtain services through the Internet for different tasks;

FIG. 7 illustrates a type of email message that can be received through the Internet on a terminal in accordance with the invention;

FIG. 8 illustrates receipt of a particular email received on a terminal through the Internet in accordance with the invention;

FIG. 9 illustrates a user information page produced by the service enabling server in accordance with the invention; and FIG. 10 illustrates the service enabling server's data structure.

DETAILED DESCRIPTION OF THE PRESENTLY PREFERRED EMBODIMENTS

Figure 1:
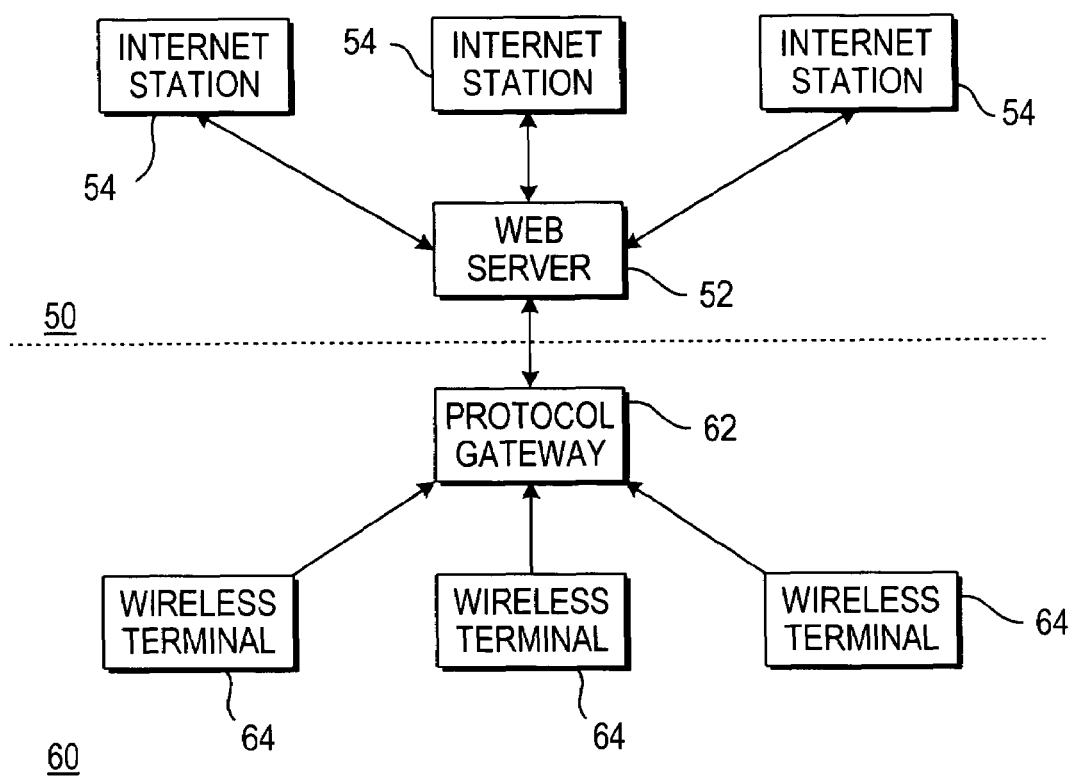
FIG. 1 depicts an Internet network and a wireless network in which customization of user behaviors and interfaces is implemented in accordance with the present invention.

FIG. 1 illustrates an Internet network 50 and a wireless network 60. The Internet network comprises a web server 52 and a plurality of Internet stations 54, which are clients to the web server 52. The Internet network uses World Wide Web (WWW) protocols. The wireless network 60 includes a plurality of wireless terminals 64, each of which can access the web server 52 via a protocol gateway 62. Terminals 64 are preferably hand-portable radio handsets but may be other wireless devices known to those skilled in the art. Communication between a wireless terminal 64 and the protocol gateway 62 may be accomplished according to the Wireless Application Protocol (WAP). WAP specifies an application framework and network protocols for wireless terminals such as mobile telephones, pagers and personal digital assistants. Moreover, as an example WAP brings Internet content and advanced data services to wireless terminals. WAP can work across differing wireless network technologies and bearer types (for examples, GSM, CDMA, SMS). Communication between the web server 52 and protocol gateway 62 is accomplished according to WWW protocols.

The wireless terminal 64 differs from the Internet station 54 in that generally the wireless terminal 64 has a less powerful CPU, less memory, restricted power consumption, smaller displays and more limited input devices. The wireless network 60 differs from the Internet network 54 in that generally the wireless-network 60 has less bandwidth, more latency, less connection stability and less predictable availability. As an example, the WAP architecture is optimized for narrow bandwidth bearers with potentially high latency and is also optimized for efficient use of device resources.

A wireless terminal 64 acts as a client and initiates a request for a connection with an origin server, preferably web server 52, to access a resource. The resource, identified by a URL (Uniform Resource Locator), is stored or generated as data at the origin server 52. The resource is typically displayed or interpreted by the client. The protocol gateway translates requests made from the WAP protocol stack used by the wireless terminal 64 to the WWW protocol stack used by the web server. The web server either returns WAP content such as WML (Wireless Markup Language) or WWW content such as HTML (HyperText Markup Language). In the later case, a filter is used to translate the WWW content, to WAP content e.g. HTML to WML. The protocol gateway 62 also encodes content sent over the wireless network 60 to the wireless terminal 64 and decodes data sent to it by the wireless terminal 64.

Figure 2:
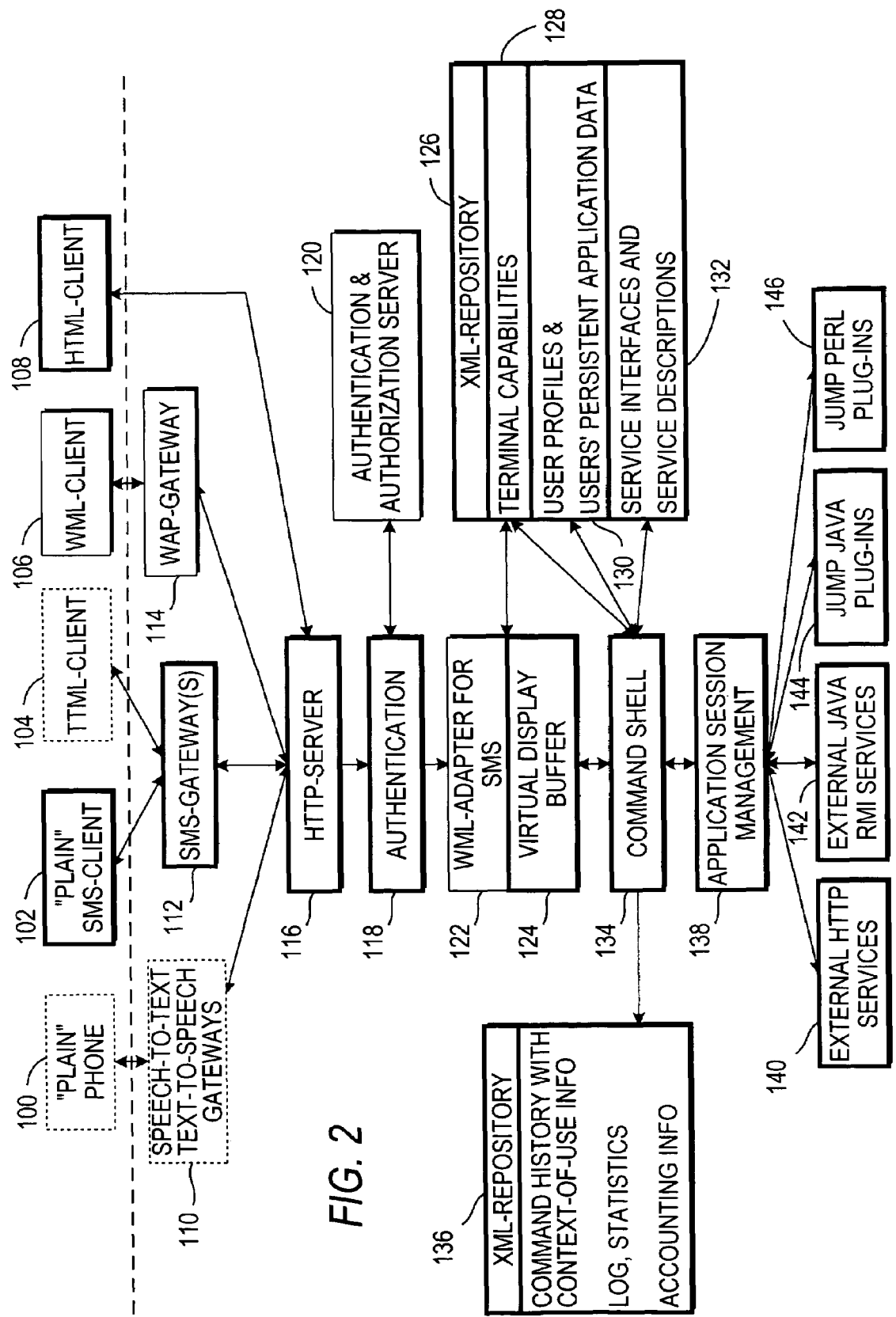
FIG. 2 depicts a schematic view of the communications network architecture of a presently preferred embodiment.

FIG. 2 depicts a block diagram of the system architecture of a preferred embodiment of the present invention. The architecture is divided into a client-terminal, wireless terminal, a gateway between the client terminal to the Internet, an interface to a Service Enabling server, and an interface between a Service Enabling server to a service server. A Short Message Service (SMS)-Client 102 communicates through an SMS Gateway 112 by using a mobile phone to access the Internet. WML Client 106 communicates with a WAP-Gateway 114 by using a mobile WAP phone to access the Internet. A HTML-Client 108 preferable communicates with a computer web browser through the Internet, or access may be through a radio access from a portal computer to the Internet's fixed network.

Also a Simple Mail Transfer Protocol (SMTP) Gateway may be a terminal adaptation between the computer and the Internet. Alternatively, access and terminal units are not limited to any particular Fixed or Plain phones 100 to provide access to the Internet using Speech-to-Text/Text-to-Speech Gateways 110, but can be any wireless device that is adapted to interface to the Internet through Gateways 110. More preferably, a TTML-Client 104 communicates through SMS-Gateway 112 by using an SMS mobile phone. TTML-Client 104 has improved Internet usage compared to a Plain SMS by using converted Internet content as an SMS message. Moreover, wideband radio access to the Internet through, e.g. GPRS, CDMA or WCDMA can be used as a terminal for a user and a terminal gateway to the Internet.

A HTTP-Server 116 is provided as an interface between a terminal gateway or terminal unit and a Service Enabling server, thus allowing access to the Internet by the user. In order to access the Service Enabling server through the Internet, an authentication block 118 is preferred to internally authenticate the user, while an authentication and authorization server 120 may be an independent server connected to the Service Enabling server. A WML-Adapter for SMS 122 is used for WML-emulation for SMS-phones by implementing the browser functionality and state on the server side which is, for example, a Java application. For example, a WML browser may be placed in the Service Enabling server and will interpret and change selected portions of the information into SMS text message form. The SMS message may then be sent directly to the terminal instead of being shown in the server. Furthermore, WWW page information, for example a URL, may be changed to a format in which an identificator (for example, <1>) is added before the URL. If a user wishes to contact that URL, the user selects the number before the WWW address. When this number is reached, the server interprets the number as it would the URL, fetches the information in the link to the server, and forwards the information in that link to the client.

Figure 3:
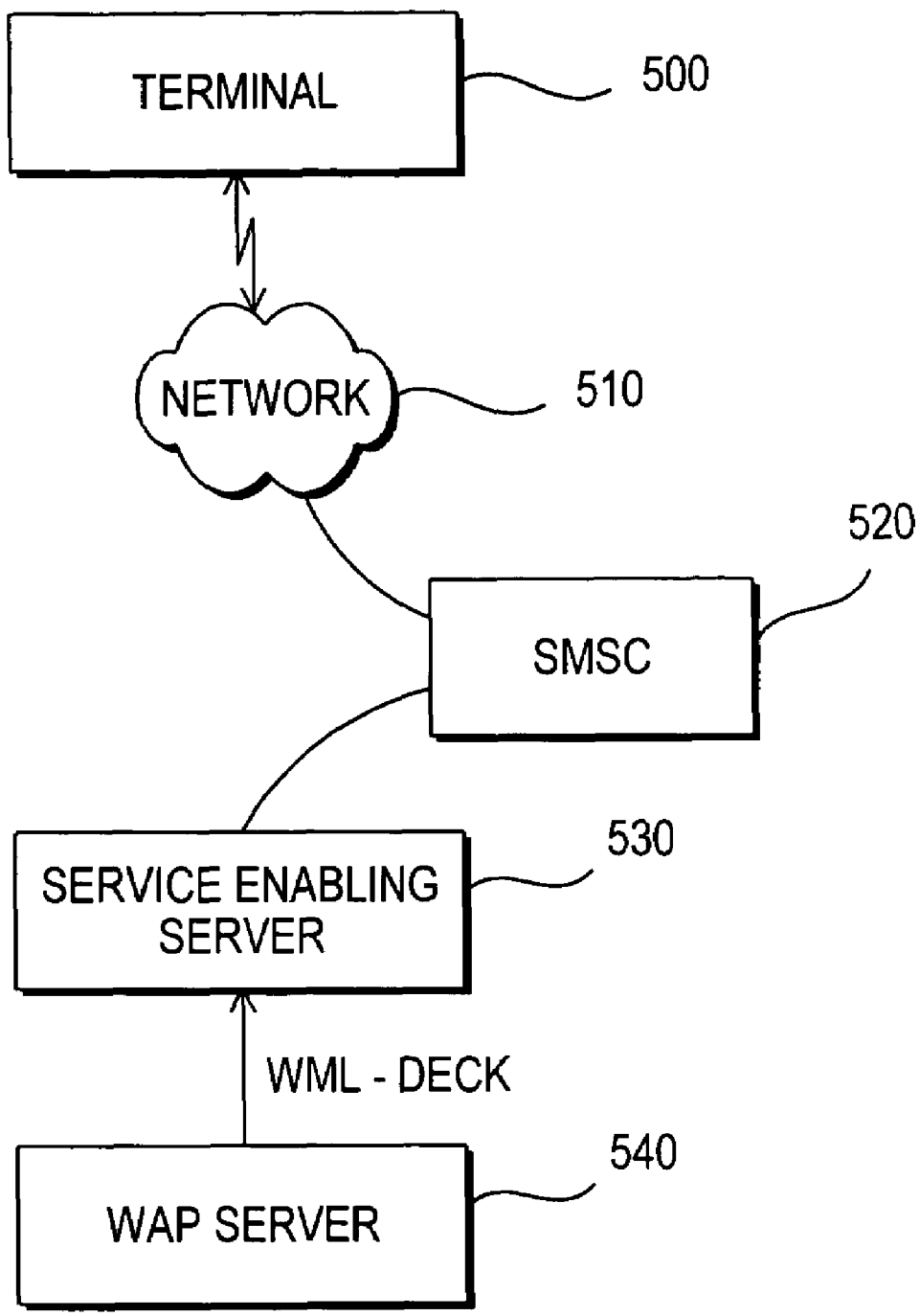
FIG. 3 depicts a block diagram of the system wherein an identifcator is assigned to a function in accordance with the present invention.

FIG. 3 is a block diagram of a preferred system of the present invention which performs this function. A terminal 500 is in communication with the network 510. The network 510 is in further communication with, for example, a Short Messaging Service Center (SMSC) application 520 or any other application with which it is desired to apply an indentificator. The Service Enabling server 530 sends and receives the SMS messages and incorporates the WML browser as discussed above. The incorporated WML browser is accessed through a WML deck which is in further communication with the WAP server 540. In accordance with an inventive aspect of the system, the Service Enabling Server 530 changes information in the WML deck to SMS text format and forwards the changed messages to the SMSC 520. The SMSC 520 then forwards these messages to the client. For example, if the WML deck contains the URL www.nokia.com, then the Service Enabling Server changes this to <1>. In this manner identificators may be efficiently used to streamline the message forwarding process.

A Virtual Display Buffer 124 is used to input and output messages of arbitrary length characters. Moreover, when the SMS sets data to a stream by entering continuation bits as a mark, the same information follows as a next message. In a preferred embodiment, the virtual display buffer 124 sends a request to the Service Enabling Server which then sends the start of a message, e.g. a SMS message. Then, a mark is placed by the sever in the end of the message which shows that the message is continued in a next SMS message to be sent by the server. The system then preferably defines a mark for scrolling text messages stored in the server and receives messages according to the information as specified by the defined mark. The message including the defined mark is then connected to the server. More preferably, the information includes commands to retrieve information about the delivery amount and commands which are interpreted in the server to inform the system that more information will be sent to the server and which should therefore be combined with each other subsequently. At this point, more information may be requested by the client from buffer 125 in the server. Thus, when a client creates a message which is too long to be sent all at once, part of the message can be sent along with a continuation mark which tells the server that a remaining part of the message will be forthcoming. The server then combines the message parts to create or recreate the entire message without the continuation mark and sends the message to the appropriate place in the communications network.

A Command Shell 134 is used to issue Service Enabling service invocations, to combine invocations of several services to composite invocations, and to fine tune invocations by specifying parameter values. An Extensible Markup Language (XML)-Repository 126 may be used as a database or a document management platform.

Terminal Capabilities 128 are XML files and data which represent features and profiles of various, different terminal units. User Profiles and User Persistent Application data 130 are XML files and data to customize and personalize information or functions about structure and content of a user profile depending on the implemented services such as, the identity of the user, the user's preferences, the particular terminal being used, and the application and software used. Service Interface and Service Descriptions 132 are XML files data and Java RMI implementations. Also, Service Interface and Service Description block 132 contains functional and directory structures implemented by Java or Java RMI. An XML-Repository is used as a database or as a document management platform for interbrowsing history or statistical information. An Application Session Management block 138 uses computational resources and software for Service Enabling to control and set Service Enabling procedures or services that are working independently or integrated to other Service Enabling services. In order to perform session management in accordance with the invention, it is desired to access an application from a first terminal and maintain an application session in the Service Enabling server. It is then desired to identify a user accessing the server from a second terminal and joining the user to the previous application as accessed by the first terminal. Session management may include converting protocols to continue the application from a point terminated by the first terminal. An example of converting protocols occurs when a user has two separate terminals and has started the session with one terminal and then desires to continue the session with another terminal.

External HTTP Services 140 corresponds with any Internet server having a URL definition, or alternatively an Internet address is directly mapped to SERVICE ENABLING as a HTTP service. Access to External HTTP Services 140 is completed by using a communication protocol that correspondences to the service type. An external Java Remote Method Invocation (RMI) Service 142 and Java Plug-ins 144 are services that can be implemented as Java class file binaries and are mapped to Service Enabling services. Java Plug-ins 144 are internal services like Java programs or scripts and composite services defined in Service Enabling command language which are appointed in an execution-environment with computational resources and controlled access to some platform resources like user profiles, service directory and terminal profiles.

Perl Plug-ins 146 are services analogous to Java Plug-ins 144, but written in Perl. These plug-ins are Perl programs or scripts that are sent to the Service Enabling platform and that are mapped to Service Enabling services upon registering. The Service Enabling application comprises toolkit services, horizontal services (such as mail, schedule, directories, news community tools, internal, and Service Enabling internal and external services).

In accordance with an embodiment of the present invention, a terminal user utilizes any terminal client unit to communicate to the Internet and a Service Enabling server to utilize services through the Internet. A predetermined Gateway enables the connection to the Internet from a predetermined terminal. The terminal adaptation contains a set of features that aim to support multiple different terminal types. These features include for example, command completion for mobile phones, content-type conversion of responses, adaptive response formatting for different display capabilities, and unified messaging services. The command completion feature parses an actual service from the command in the request. It accepts inputs, such as a terminal type, a command name, a user id., and flags specifying the order in which the command completion should be accomplished. These inputs exist in a user profile. Terminal adaptation operations in the gateway and in HTTP server 116 can receive requests with a client protocol, create an HTTP request, set an accept, and convert HTTP responses to a client protocol. The Service Enabling server communicates through the web and is accessed through an HTTP interface. Only web browsers typically can utilize this interface directly, so for mobile phones and other more exotic clients there is a gateway that handles at least the communication protocol specific to the terminal type.

Input/Output channels in the Service Enabling server comprise gateway and corresponding access Servlets. The set of these pairs offers uniform messaging for the Service Enabling server core between different terminal types. They can be interactive (e.g. a web browser), support push (e.g., email), or both (e.g., SMS). There is a specific access Servlet for each client type and gateway supported by the Service Enabling server which is architecturally situated between the HTTP-server and the Service Enabling core. All the different gateways may be handled by a single Servlet, but this solution is more modular. Adding and removing Input/Output channels may be accomplished without rebooting the Service Enabling server. Flexibility is achieved by utilizing the Web server's authentication and access restrictions in one Servlet.

An access Servlet is, for example, an authentication server 118 or an authentication and authorization server 120. The Servlet receives a HTTP request from the gateway or the browser. The HTTP request comprises a User-Agent (e.g., a gateway or browser name), an Accept (e.g., list the MIME types that client/gateway can handle), an Authorization (e.g., which authentication scheme is used and how it depends on each access Servlet), a Context-type (e.g., indicating that the message is something other than a command line), a calendar event which cannot be sent to command shell 134, or a POST data containing the message.

The access Servlet performs authentication using the separate authentication server 120. The server 120 checks the user identity, either based on an account-password pair or on a Mobile MSISDN. When the password used is successful, it can return an internal Service Enabling user id. This requires that the authentication server 120 contains the information about the users such as, user id., account name, password, and MSISDN. For authentication that is based on MSISDN, there may be options like, (1) MSISDN found, return the corresponding user id, (2) MSISDN not found, but with the allowed operator id create a temporary user id for the correct IO channel (this requires that the access Servlet passes this information to the server), and (3) MSISDN not found, start with the excluded operator id and return authentication failed. The access Servlet creates a new transaction for the user and executes it with the request. The access Servlet then gets the content results of the transaction and the content-type related to it, or catches an exception, if the output channel differs from the input channel. The supported content conversions should be at least in text/HTML to text/plain, text/HTML to text/TTML, or text/HTML to text/TTML formats.

In order to perform terminal adaptation, the Service Enabling platform requires information regarding the client terminal devices. The Service Enabling server provides commands as services through which such information can be gathered. The Service Enabling server also provides an interface for external services to access such commands and to get information regarding the client's accessible terminal.

The "Display" Command is used to obtain details regarding a terminal's display capability. This is used to present information in a formatted manner based on the display capabilities of the terminal. The "KeyPad" command fetches from the User profile and the terminal profile the required KeyPad related information of a terminal. When the Terminal name is not available, it looks for the user's default terminal. A "Command Completion" command is used to complete or construct an input which was made by the user to a text known by the service. The construction of this text is based on the keys in the Keypad of the terminal in use.

Alternatively, the user may wish to receive a response of a certain service though a different terminal than that used when making requests. For example, if a "fairytale" service (i.e., a web site that publishes fairy tale stories for example) is known to produce long stories, the user might want them to be sent by email, even though they are requested by SMS phone. The user therefore defines in his profile that the output of a service must always be sent to a certain terminal (identified by output channel and address). The choice concerning redirection is made in command shell 134 and requires that commands be defined to identify the output channel, the address for the channel, the input channel name passed from a calling Servlet, the output manager to send the response to, and the current input channel if the user has been defined.

As an alternative to single terminal usage, the Service Enabling server may have at least two kinds of broadcast messaging services: a generic messaging service (which supports multiple output channels), and a broadcast messaging service with a fixed output channel, for example email. These two broadcast messaging services act in a similar way and all the messaging services interpret all the parameters output by them to be addresses (MSISDN, email, etc.), usernames or recipient lists. When a parameter is not a phone number or email address, it will be either, a Recipient_list name, an Address_book.person.name or a Service Enabling user account. When fetching the delivery list, a generic messaging service passes a dynamic channel parameter to the terminal, for example the email service passes "email". The channel parameter only affects address book items, which refer to Service Enabling users. When a channel is dynamic, the referred user's current terminal address is returned, otherwise the named terminal's address is returned.

In accordance with the invention, a WML-Adapter for SMS 122 is used for WML-emulation of SMS-phones by implementing the browser functionality and state on the server side, e.g. with a Java applet. Virtual Display Buffer 124 is used to input and output messages of an arbitrary character length. Moreover, for the SMS to set data to a stream by entering continuation bits as a mark, the same information must follow in a next message. Thus, the input should be concatenated from several SMS-messages and the output buffer may have functions like the typical pager programs in a Unix computer system, e.g. "less" and "more" commands. Communication between the terminal user and service is through VDB. Moreover, VDB can be used as a plain through-passage while communicating between the terminal and the server without modification to signals in the communication.

FIG. 2 Terminal Capabilities 128 are defined in XML-files as Terminal Profiles. In order for the services to utilize the capabilities of a terminal device, they require access to information, which describes the terminal capabilities. Using such information, the service platform can personalize or customize the results best suited to a specific terminal. Terminal elements to define characteristics or capabilities of a terminal can be for example, Identity, Display, Input and Connection. Identity follows a two level name space, where it first expects the vendor name and model name of the terminal, it then expects the vendor name and the version of the terminal. The following examples show the necessity for such a naming scheme:

vendor name as "NOKIA" and the model as "6110".
vendor name as "NETSCAPE" and the version as "4.5".

Display can define the type of display device that exists in the terminal such as the image display capability, character display capability, and display buffers if any. Details of the variable character size display will help the service platform to format the information to be presented on a user's terminal.

In "Input" some entered information can be constructed at the platform end. For example, the user could only type the first character or few characters which represents a complete command and the rest can be built at the service platform. Thus, for "email" the user could just enter "ema" and the rest is rebuilt as "email" at the service platform. Details regarding the input device, can also be presented whether it is a keypad, or a keyboard and the pattern in which the characters exists on them. This can influence the manner in which the service platform provides services to a specific terminal.

"Connection" is related to the type of connection the terminal uses to access the service platform. The types of connections which the various terminals can support are for example, SMS, WAP, HTTP, SMTP, or other various communication protocols which the terminal and platform use and which they can support. A message may follow the protocol such as HTML, TTML, PLAIN SMS, or other forms which the terminal and platform use. These messages enable various special functions, e.g., display of images, decks, cards or ringing tones.

Figure 4:
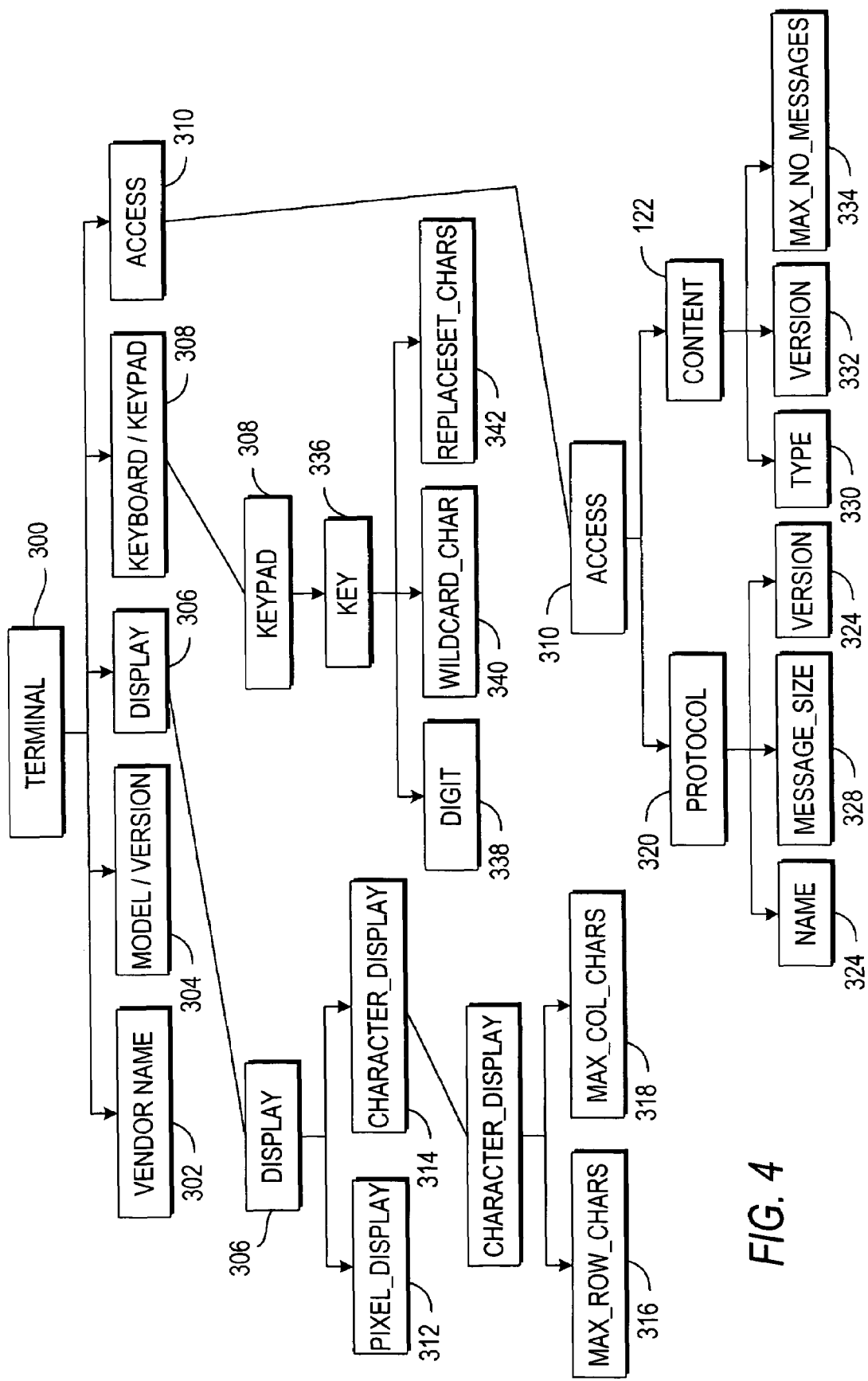
FIG. 4 depicts a block diagram of an information structure utilized to personalize and customize terminal elements.

In the presently preferred embodiment, terminal profiles are presented using XML-files. Syntax of these XML-files are defined in a Document Type Definition (DTD). Elements of terminal profiles in the file data structure are described in FIG. 4 by using Tags to describe the feature concerned: A Terminal 300 presents a specific terminal of a user. A Vendor name 302 specifies the name of the vendor that produces terminals. In addition to the model/version, this forms a unique identity for a terminal. The Vendor name can be used by the system to categorize the terminals based on the vendors. A Model/Version 304 tells the system to identify the terminal based on the model or version set by the vendor of that specific terminal thus providing a handle to identify the terminal-related information from a repository.

A Display 306 is represented on a display screen of the terminal and may have terms related to the basic display mechanism of the terminal, which can be useful for any application which displays information in a specific format. The types of displays are divided by the manner in which the terminal represents information. The two common types are rebuilding a pixel display 312 and a character display 314, which can display information in the smallest unit to be considered in terms of pixels or characters.

A Character Display 314 displays only the details that might be required such as maximum characters that can fit into a row (represented by the tag: max_row_chars), and maximum characters in a column (represented by the tag: max_col_chars). These tags correspond to characters being displayed on a single screen. The maximum number of characters the terminal can display is also required and this is based on the type of access mechanism the terminal supports. For example SMS restricts the size of the message to a maximum of three-hundred and sixty characters. This is defined by a Message Size parameter 326. This maximum numbers of characters can be used also when it is required to deduce the off-screen buffer size.

Pixel Display 312 of the display terminal can handle multiple sizes of characters and each character can occupy varying sizes in the display area. Displaying each character is based on the number of pixels each character takes up. Such a display will also have the capability to display images, thus more details in terms of pixels will be required for applications to display information in a more presentable manner. Information such as the maximum number of pixels on a single row (represented by the Tag: pixels_row) and the maximum number of pixels on a single column of a single display screen (represented by the Tag: pixels_col) are required to place the information in presentable form.

The number of pixels a single character would occupy in a column (represented by the Tag: ypixels_char) is required to identify the number of lines in which the information can be presented in a single screen. The characters may vary by the number of pixels they can occupy in a single row based on the type of character, and there are three such sizes any character can occupy. They are represented by a character space (represented by the Tag: space) which occupies the minimum number of pixels, n, which occupy the average number of pixels (represented by the Tag: en_space,), and the character, m, which occupies the maximum number of pixels (represented by the Tag: em_space). All of these tags are be sufficient to display any information or image on a single screen. In-order to identify the off screen area or buffer size, it is sufficient to identify the maximum number of characters that can be displayed in that terminal.

An access block 310 indicates the capability to receive/send messages from/to the service platform using a specific protocol. The details required are, e.g., a name 324 of a protocol 320 (represented by the Tag: name), a version 328 (represented by the Tag: version), and a message size 326 indicating the maximum size for a message specific to a protocol 120 that is represented in the message size (represented by the Tag: message_size). Content 322 indicates the particular messaging format that the protocol supports (represented by the Tag: content). The details, such as type 330 (represented by the Tag: type) specify the messaging format and a version 332 (represented by the Tag: version). Under certain protocols a specific number of messages can be forwarded using a specific content type which in turn can be concatenated at the terminal. This is represented by a maximum number of messages 334 (represented by the Tag: max_no_messages). The value type 130 tag is specified in the DTD.

"Protocol Name" is predefined similar to the content type 130 and can only carry a value which is predefined in the DTD. A simple example for access to the protocol name is as follows:

| protocol |
| --- |
| name : wap |
| version: 1.0 |
| message_size: 160 |
| content : |
| type : text/x-Vcard |
| version : 1.0 |
| max_no_messages : 1 |
| type: text/x-Vcalendar |
| version : 2.0 |
| max_no_messages : 2 |

Any terminal capable of sending a message should in some manner enable the user to input information to be sent to a service platform such as by using a keyboard or a keypad. In accordance with the invention, a Keyboard is a device, which has a specific key or key combination to input each alphanumeric character, while a keypad has a key which represents a set of characters. A Keypad 308 is considered to contain a key 336 that sets which element will represent the alphanumeric characters (represented by the Tag: key). A digit 338 in key 136 (represented by the Tag: digit) and characters can be represented in such a manner that one can be a wildcard for the other characters. For example in a key with characters [1abc], a digit [1], represents [abc]. Moreover, when representing a terminal capable by only inputting digits a wildcard 340 (represented by the Tag: wildcard_char) can be used e.g. to enter [a] for rest of the characters [bc], which are called as "replace chars" 342 (represented by the Tag: replaceset_chars).

In the presently preferred embodiment, in the user profile 130 customizes and personalizes the services. In some cases there is a need for information about the user, for example, his preferences, and the terminals and software being used. This information is stored in user profile 130. The structure and a content of user profile 130 is highly dependent on the implemented services and the customization and personalization functions they use.

In accordance with the invention, a portal-like gateway to value added services is provided. The gateway is operated by an operator and provides access to services provided by different content providers and users. Since the user has one single access point to services, there is no obstruction to having a central user profile in the implementation platform. Some parts of the user profile can also be used by several services. In a preferred embodiment, the user profile 130 can vary according to its structural information in service invocations without any information structure limitations.

Figure 5:
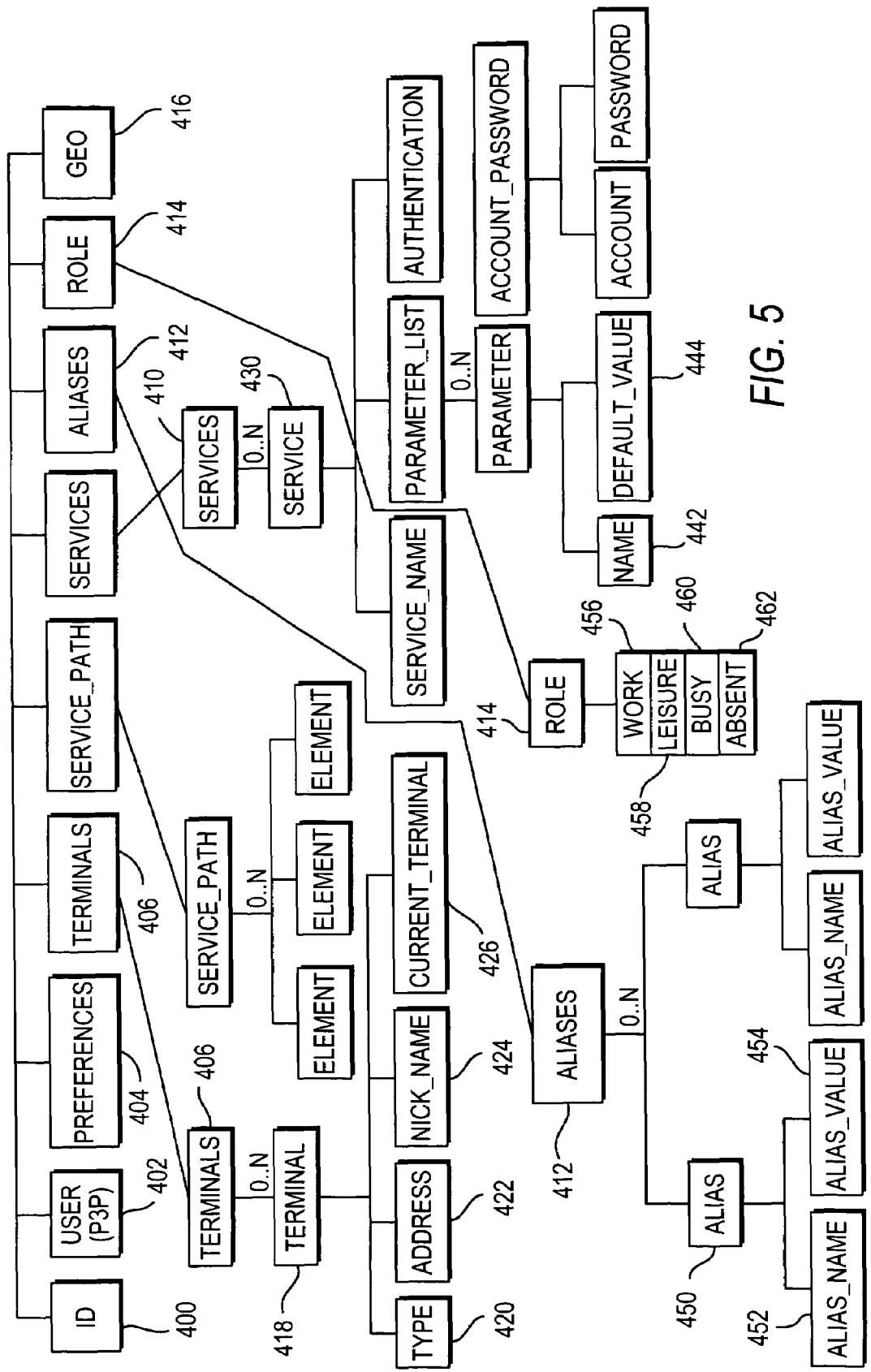
FIG. 5 depicts a block diagram of an information structure utilized to personalize and customize user profiles.

The user profile is designed in a modular way wherein the information is grouped according to how the information will be used. The main (high level) structure of the Service Enabling user profile is presented in FIG. 5. The user profiles comprise various elements, e.g., an id 400, a user (P3P) 402, containing user information according to P3P, preferences 404 containing generic user preferences, terminals 406 containing terminal data for customization, a service path 408 for used services and service packages, services 410 containing personalization data of the different services, aliases 412, a role 414 containing descriptions of the current role of the user, and a geo 416 which may contain a user's location. The different parts of the profile are described in more detail below with examples of then XML and an underlying DTD.

Id 400

Instead of a unique user id, id 400 may be a number in a number sequence starting with, for example, 1. Id 400 will not have a predetermined numerical length. An access module in the system will map the identified user according to, e.g., username or MSISDN, with the correct unique key and user profile. The DTD definition by this function is preferably as follows:

<!ELEMENT id (#PCDATA)>

XML example:

<id>212<id>

User (P3P) 402

An important part of the user profile is information about the user. In accordance with the invention, a data set specifies in the Platform for Privacy Preferences (P3P) to provide information about the user. By implementing P3P, it is possible to enable the user to control access to his profile information and to decide how it can be used.

In addition to P3P, other standards exist which use general user information, (e.g., contact information) and which can be implemented in accordance with the present invention. These include the information defined in a video card (Vcard), and information structures used in LDAP and X.500. There are alternative embodiments to the presently preferred embodiment of P3P. General user information can be provided in other known ways.

Preferences 404 are additional alternative features for use in the presently preferred embodiment. Preferences 404 describe a generic profile which the user and several services may have access to that several services may use it. Services in the system can be classified according to a certain service metadata structure, and the same kind of metadata structure can be used to describe the generic user preferences. An RDF or XML based structure can be used in preferences 404.

Terminals 406 include terminal data which can be used for customization. The terminal type, 420 is a reference to the terminal description of that specific terminal. It is also possible to specify an address 422, e.g. MSISDN, and a nickname 424 for the terminal. In addition, the user can specify a current terminal 426. The messaging will be optimized according to the characteristics of the current terminal. The DTD definitions of this customization is preferably as follows:

```
<!ELEMENT terminals (terminal)*>
<!ELEMENT terminal (type, address?, nick_name?, current_terminal)>
<!ELEMENT type (#PCDATA)>
<!ELEMENT address (#PCDATA)>
<!ELEMENT nick_name (#PCDATA)>
<!ELEMENT current_terminal EMPTY>
<!ATTLIST current_terminal status(off|on) off>
An XML example:
<teminals>
<terminal>
    <type>Nokia 6110</type>
    <address>+358407339693<address>
    <nick_name>smart</nick_name>
    <current_terminal status="on" />
</terminal>
<terminal>
    <type>Nokia Communicator</type>
    <address>+358401111111</address>
    <nick_name>com</nick_name>
    <current_terminal status="off" />
</terminal>
</terminals>
```

Aliases 412 simplify the interaction with the system from a terminal with a text interface, e.g., a personalized and easy SMS message interface. With help of an alias 450, the user can specify his own, easy to remember and/or shorter commands and service calls. The aliases specified by the user are stored in the user profile. The aliases are defined as an attribute-value pair, wherein attribute alias name 452 may be the command to be used by the user, and the alias value 454 may be the original command. There may be an unlimited number of alias definitions in the profile. When receiving a request, the command shell checks the profile of the user for existing aliases before handling the request. The DTD definition of the aliases is preferably as follows:

```
<!ELEMENT aliases (alias)*>
<!ELEMENT alias (alias_name, alias_value)>
<!ELEMENT alias_name (#PCDATA)>
<!ELEMENT alias_value (#PCDATA)>
An XML example:
<aliases>
    <alias>
    <alias_name>npb</alias_name>
    <alias_value>punagant.npb</alias_value>
    </alias>
    <alias>
        <alias_name>weather</alias_name>
    <alias_value>weather HKI $2 $1</alias_value>
    </alias>
    <alias>
```

```
        <alias_name>short</alias_name>
        <alias_value>service1 ! service2</alias_value>
    </alias>
</aliases>
```

The three alias examples below reflect how the alias mechanism can be used. In the first case, the alias is only used to remap the command name (punagant.npb) to another shorter command name (npb). In the second case, the alias mechanism is used to set default parameter values and re-arrange parameter order. The syntax is preferably a Unix shell. Parameters are thus referred to with $<parameter number> where the number comes from the input order in the alias. Below is a list of how the parameters may be referred to:

Parameter N::=$N

All parameters::=$*

Parameter range M to N::=$M-N

In the third case, the alias mechanism is used for creating composite services.

A role 414 can be used to specify the current role of the user, e.g., if he is at work or if he is not at work. The user defines the current role. Alternatively, a mechanism may be used wherein the time itself can indicate the current role. The role is used by different services. The services can utilize the role information in many different ways, for example to make rule-based delivery of content to the user. The role may have a plurality of different values, e.g., four possible values: work 456, a leisure 458 (time), a busy 460, and absent 462. The DTD definition of this function is preferably as follows:

```
<!ELEMENT role EMPTY>
```

```
<!ATTLIST role status(work|leisure|busy|absent) work>
```

XML example:

```
<role status="work"/>
```

The current location of the user is also a potential personalization mechanism. In an alternative embodiment use of such information allows the user to specify his location. The location Geo 416 is then stored in the profile. If the location can be received automatically from an external positioning systems, this field will not be needed in the user profile. The DTD definition of this function is preferably as follows:

```
<!ELEMENT geo (location)>
```

```
<!ELEMENT location (#PCDATA)>
```

The XML example of GEO 416 is:

```
<geo>
```

```
<location>Helsinki</location>
```

```
</geo>
```

In the first case, the alias is only used to remap the command name (punagant.npb) to another shorter command name (npb).

In the second case, the alias mechanism is used to set default parameter values and rearrange parameter order. The syntax is Unix shell like. Parameters are referred to with $<parameter number>, where the number comes from the input order in the alias. Below a list of how the parameters can be referred to:

Parameter N::=$N

All parameters::=$*

Parameter range M to N::=$M-N

In the third case, the alias mechanism is used for creating composite services.

To implement the above functions and create a selection list in accordance with the invention it is desired to first initiate and then maintain a session in the Service Enabling server. The session maintaining step further comprises the step of mapping between a group of selection list identifiers (ids) and corresponding service requests. A selection list is then sent from the server to the terminal and a single or a plurality of numbers are allocated from the terminal(s) to the server in response to the list. The number(s) are then mapped to the list in the server, the corresponding service request is initiated on the server, and the information related to the service is transmitted to the terminal(s).

FIG. 6 illustrates an exemplary web page that a user can access through the Internet on a terminal to utilize services of interest to the user. A Web interface allows the user to become familiarized with the services and allows the user to access "help" functions and lists of services that may be of interest to the particular user. This page also describes to the user the particular customized profile and email configuration which the user may access.

FIGS. 7-10 describe the functions which allow the user to configure and use the terminal and use email in accordance with the invention. It should be understood by those skilled in the art that this is a non-limiting description of such functions and that additional functions may also be provided for access by the user.

The server has some general features that are aimed to make the usage of services as fast and easy as possible, considering the obvious limitations of SMS-messaging. In the page of FIG. 6, there is a "help" command that displays the names of all available Service Enabling services. A "help"-command with a parameter will give help about using the command that was given as a parameter. Thus "help help" will provide a guide to use help and, "help mail" will provide some instructions on how to use the Service Enabling email-client.

Command Completion

Two different command completion mechanisms are used to speed-up the typing of commands. First, an unambiguous prefix of the command is sufficient. For example "he" will be recognized as "help" (unless there exists other commands in the system that start with the same prefix). A T9-type of command completion is also performed. Such that if it has been specified in your user profile the type of terminal that you are using this mobile will be accessed. The, for example, it is possible to type the command "mail" as "magj" (m-a-g-j are the first letters in each key in a typical Nokia phone keypad). The Service Enabling matches this "magj" to "mail" because it knows the layout of the keyboard and all the existing Service Enabling command names).

In accordance with the invention, frequently used commands may be made as short as possible by making personal aliases for a user, for example:

Alias h may be, help;

Alias m may be, mail;

Alias send mail may be s, and

Alias groupsend mail s john.doe@hotmail.com may be Joe.smith@nokia.com

These new aliases may be created directly from the phone terminal by giving them as commands and sending them to a Service Enabling-service number, or the user may login to the Service Enabling account and add the aliases by editing the personal profile. The user may also check the aliases by just giving the command "alias" without any parameters. Moreover, if the users are unsure of how a command completion and alias substitution will resolve a certain command, they may set the abbreviated version of the command as a parameter to a "help" command and check how it is resolved. Command completion and alias substitution is done for the first parameter of the "help" command as a special case.

The Service Enabling server has a UNIX-like command shell with some advanced features for combining commands. For example, "spaces" are used to separate parameters in the command line. If it is desired to have several words as one parameter, they are enclosed in doublequotes such as "This is one parameter." Moreover, there are some special characters that are used as delimiters such as # " ' !, ( ) for example: If these are needed for parameters they also may be placed inside doublequotes, wherein doublequotes can be made literal by preceding them with #-sign. An important convention is that command parameter list is terminated with a colon ":". This is needed when its desired to give some general text input for a command (in addition to the parameters). For example sending mail can be accomplished by the following command:

Mail s joe@nokia.com jill@nokia.com, olli@nokia.com: This starts the actual mail message body and as many recipient addresses in the list may be provided as desired. The "colon", shown in this command ends the parameter list and starts the input to the mail command, which in this case is the message itself. The special characters, # " ' !, ( ): lose their special meaning after the first colon in a command line.

The Service Enabling server has a general mechanism for dealing with messages longer than the size of one SMS-message. If the reply from the Service Enabling server is longer than what fits into one message, only the first part is sent, but at the end of the message, information will be provided in the format "–7%" that says that only 7% of the whole message was sent to the mobile phone. To read the rest of the message, the user can requests it from the Service Enabling server by sending a message containing only a space character " " ("+" "!" and number one "1" work as well). The Service Enabling server will reply back by sending the next part of the long message.

Other ways of asking for different parts of the message may be provided for example giving a command like ".smith," will move to a part of the message that contains the word "smith." Additionally, two very handy commands (for reading e-mail messages for example) are "!e" which sends the rest of the buffer as several SMS-messages and, "! a" which sends the whole buffer starting from the beginning. Other important commands, for example to "ask for more information from the I/O buffer" for the next part of the message, and "!e," for the rest of the buffer, and the dot ".", followed by a string for searching the string from the I/O buffer.

If a longer message is needed that can fit into one SMS-message, the message can be ended with a plus, "+," sign. If the message ends with the plus "+" sign, the Service Enabling server waits for the user to send the next SMS to complete the message. Messages of any length can be created by using this feature.

The Service Enabling server email-client works only if it is first configured in the user's Service Enabling user profile to access the exchange mailbox. The Service Enabling email-client is a general email-client for accessing mailboxes that support IMAP4-protocol and can be used to browse folders, read email, send, forward, and reply to messages. The Service Enabling's alias mechanism may be used for simulating address lists, etc.

The Service Enabling email command interface is a "mail" command. The first parameter of the mail command specifies options such as:

Mail n (list New (or actually unread) headers; (If only one unread message exists, it is fetched automatically);

Mail b (browse the current folder or read the message specified by the second parameter, if the second parameter is a folder name, browse that folder);

Mail s (send mail);

Mail r (reply to current mail message or to the message specified by the second parameter);

Mail f (forward the current mail message or the message(s) specified by the rest of the parameters);

Mail q (query the current list of mail messages for the string in second parameter, Wherein a string is searched from the "From" and "Subject" fields as well as from the actual body of the messages, and a new list of matching messages is returned); and Mail m (mark unread messages specified by the parameters as read, i.e., "Mail m a" marks all unread messages as read).

Some examples of the Service Enabling mail function are:

1. Check new (unread) mail messages:
Mail ("mail" with no parameters defaults to "mail n")
2. Read the 2. Mail-header from the list:
M b 2 (Assuming from now on that you have made "alias m mail")
3. Browse the "to do" folder
M b todo
4. Reply to the mail you just read:
M r: Hi, just replying to your mail . . .
5. Reply to 3.Mail-header in the list:
M r 3: Hi, just replying to your mail . . .
6. Forward the mail you read:
M f joe.smith@nokia.com
7. Forward the 4. Mail from the last generated mail-header list:
M f 4 joe.smith@nokia.com CC aari.jones@nokia.com
8. Send new mail:
M s joe.smith@nokia.com aari.jones@nokia.com: Hi guys, how about a round of golf tomorrow?
9. Query mails that contain certain word(s) in "From" or "Subject" fields or in the actual content of the message:
M q smith (this will list the headers of the mails (in your INBOX) that contain word "smith")
10. Mark the first, third and sixth message in the current list as read:
M m 1 3 6

Feedback to the Service Enabling server allows the user to send us email to the address Service enabling-feedback@ppt.com, for example.

While there has been shown and described certain fundamental novel features of the present invention as applied to preferred embodiments thereof, it will be understood by those skilled in the art that various omissions and substitutions and changes in the methods and apparatus described herein, and in their operation, may be made by those skilled in the art without departing from the spirit and scope of the invention. It is expressly intended that all combinations of those elements and/or method steps which perform substantially the same function in substantially the same way to achieve the same result are within the scope of the invention. Substitution of elements from one described embodiment to another are also fully intended and contemplated. It is the intention, therefore, to be limited only as indicated by the scope of the claims appended hereto.

I claim:

1. A communications service system for transmitting data between terminals and through the Internet, comprising:

a Service Enabling server connected to the Internet for receiving a request for a necessary service from a terminal of a requesting user, said request including an identifier (ID) for identifying a terminal type of the terminal, the Service Enabling server comprising user profiles for a plurality of users and terminal capability files containing terminal profiles for a plurality of specific terminal types, each of the user profiles identifying preferences and terminal types used by a respective one of the plurality of users, wherein upon receiving the request by the Service Enabling server from the terminal, the Service Enabling server retrieves from a server on the Internet the necessary service requested by the requesting user, and the information relating to the necessary service is changed, by the Service Enabling server, from a form that is output by the server to a form that is compatible with the terminal of the requesting user, a terminal type of the terminal used by the requesting user being determined from a corresponding one of the user profiles based on the ID and said form that is compatible with the terminal being determined by looking up the determined terminal type of the terminal used by the requesting user in the terminal capability files, wherein said Service Enabling server includes a list of selection identifiers for service requests, said Service Enabling server replacing the name of the service requests with the selection identifier in messages to the terminal to streamline the message forwarding process.

2. The system of claim 1, further comprising a client protocol which is received by the Service Enabling server with the request for information relating to the necessary service and wherein the Service Enabling server further creates HTTP requests and converts HTTP responses to the HTTP requests to the client protocol.

3. The system of claim 1, further comprising a plurality of terminals, each including a set of terminal parameters comprising command completion parameters, content type conversion of responses parameters, adaptive response formatting for different display capability parameters, and protocol conversion parameters.

4. The system of claim 1, wherein the Service Enabling server outputs the information in WML content and converts the WML content to SMS content.

5. The system of claim 1, wherein the Service Enabling server outputs the information in HTML content and converts the HTML content to WML content.

6. The system of claim 1, wherein the Service Enabling server outputs the information in HTML content and converts the HTML content to SMS content.

7. The system of claim 1, further comprising a plurality of terminals, each including a set of terminal properties and wherein the Service Enabling server cuts content from the information and sends only an amount of the information which fits a display on the at least one terminal in the plurality of terminals, and wherein the user sends a new query to the Service Enabling server in response to the cut content and the at least one terminal receives a next portion of content that includes an identifier for the cut content.

8. The system of claim 7, wherein the at least one terminal in the plurality of terminals is a mobile phone.

9. The system of claim 1, further comprising a special-applications server and a terminal gateway to the special-applications server, said terminal gateway and said terminal being controlled according to technical capabilities of said terminal gateway and said terminal.

10. The system of claim 1, wherein said ID is a Mobile MSISDN (mobile subscriber integrated service digital network) or account-password pair.

11. The system of claim 1, wherein the terminal of the requesting user is a phone which accesses the Internet using Speech-to-Text/Text-to-Speech Gateways.

12. The system of claim 1, wherein the terminal of the requesting user is any wireless device adapted to interface to the Internet through gateways.

13. The system of claim 1, wherein the user profile of said Services Enabling server comprises user persistent application data including identity of the user, user preferences, terminal being used to access the Services Enabling server, and application and software being used.

14. The system of claim 1, further comprising a plurality of gateways for different types of terminals.

15. The system of claim 1, wherein said Service Enabling server comprises terminal adaptation features for supporting a plurality of different types of terminals, said terminal adaptation features including command completion, content-type conversion of responses, adaptive response formatting for different display capabilities, and unified messaging services.

16. The system of claim 15, wherein said command completion feature parses an actual service from a command received from the at least one terminal and accepts inputs including at least one of terminal type, command name, user id, and flags specifying an order for command completion.

17. The system of claim 16, wherein the inputs are stored in a user profile.

18. The system of claim 1, wherein said Service Enabling server comprises at least one access Servlet comprising an authentication server or an authentication and authorization server.

19. The system of claim 18, wherein said Service Enabling server performs authentication using a separate authentication server which checks the user identity based on an account-password pair or an MSISDN.

20. The system of claim 18, wherein the Service Enabling server comprises a gateway/access Servlet pair comprising a gateway Servlet and a corresponding access Servlet for each of the different terminal types.

21. The method of claim 20, wherein a set of said gateway/access servlet pairs offers uniform messaging for the Service Enabling server between different terminal types.

22. The system of claim 1, wherein said Service Enabling provides commands as services as an interface for external services to access information regarding client terminal devices.

23. The system of claim 22, wherein said commands comprise at least one of a display command for obtain details of a terminal display, a keypad command for obtaining details of a terminal keypad, and command completion for transform an input into a text known by the service.

24. The system of claim 1, wherein said terminal profiles for each terminal type in the terminal capability files comprise at least one of terminal identity, display, input, and connection characteristics.

25. The system of claim 24, wherein the display characteristics comprise at least one of image display capability, character display capability, and display buffers.

26. The system of claim 24, wherein input characteristics comprise details regarding the input device.

27. The system of claim 24, wherein connection characteristics comprise details related to the type of connection used to access the server platforms.

28. The system of claim 24, wherein said terminal profiles comprise XML files.

29. The system of claim 1, wherein said terminal identity comprises vendor, model and version.

30. The system of claim 1, wherein said ID for identifying a terminal type of the at least one terminal further identifies the user of the at least one terminal.

31. The system of claim 1, wherein said user profile includes information identifying the user and the terminal type.

32. The system of claim 1, wherein each of the user profiles further comprise user identity, aliases of commands, status and the location of the corresponding user.

33. A method of communicating services and customizing behaviors and interfaces for services invocations through a plurality of terminals interfaced to the Internet, comprising the steps of:

transmitting, by a requesting user through one of said plurality of terminals, a request for a necessary service including an identifier (ID) for identifying a terminal type of the one of said plurality of terminals;

receiving, by a Service Enabling server connected to the Internet, the request, wherein each of said plurality of terminals are configured to independently access the Service Enabling server;

upon receiving the request by the Service Enabling server, selecting, by the Service Enabling server, a necessary service requested by the requesting user;

determining a terminal type of the one of the plurality of terminals used by the requesting user from a user profile of the requesting user stored on the Service Enabling server based on the ID, the user profile identifying preferences and terminal types used by the requesting user;

changing a form of the information relating to the necessary service that is output by the necessary service to a form that is compatible with the determined terminal type of at least one terminal of the requesting user, wherein the form that is compatible with the determined terminal type is determined from terminal capability files stored on the Service Enabling server, the terminal capability files including data representing features and profiles of various different terminals, wherein said step of transmitting comprises buffering information, said step of buffering comprising creating a message to be sent through the communications network, wherein the message is too long to be sent at one time, specifying a continuation mark for the message and sending a part of the message with the continuation mark, sending a remaining part of the message omitting the continuation mark, receiving the message parts at the Service Enabling server and combining the message parts to create the message without the continuation mark, and sending the message to a destination in the communications network.

34. The method of claim 33, further comprising the step of receiving a client protocol by the Service Enabling server the request for the information relating to the necessary service and wherein the Service Enabling server further creates HTTP requests and converts HTTP responses to the HTTP requests to the client protocol.

35. The method of claim 34, further comprising the step of outputting the information in WML content and converting the WML content to SMS content.

36. The method of claim 34, further comprising the step of outputting the information in HTML content and converting the HTML content to WML content.

37. The method of claim 34, further comprising the step of outputting the information in HTML content and converts the HTML content to SMS content.

38. The method of claim 34, further comprising the step of cutting content from the information and sending only an amount of the information which fits a display on the at least one terminal in the plurality of terminals, and wherein the user sends a new query to the Service Enabling server in response to the cut content and the at least one terminal receives a next portion of content that includes an identifier for the cut content.

39. The method of claim 33, wherein the Internet includes a service-providing server, said method further comprising the step of creating a selection list with selection list identifiers including the sub-steps of:

initiating and maintaining a session in the service-providing server by one of the plurality of terminals and mapping between the selection list identifiers and corresponding service requests;

sending the selection list from the service-providing server to the one of the plurality of terminals;

displaying the selection list on a display of said one of said plurality of terminals;

answering from the one of the plurality of terminals in response to the selection list with at least one selection list identifier;

mapping the at least one selection list identifier to the selection list in the service-providing server and initiating the corresponding service request on the server; and receiving, by the one of the plurality of terminals, information relating to the service request.

40. The method of claim 33, further comprising the steps of:

changing the form of the information relating to the necessary service requested by the user to a second form that is compatible with at least one of a second terminal of the plurality of terminals;

defining the second terminal by a user's profile in the Service Enabling server; and transmitting the information relating to the necessary service to the second terminal.

41. The system of claim 33, wherein the user profile further comprises user identity, current terminal being used by the requesting user to access the Service Enabling server, aliases of commands, status and the location of the requesting user.

42. A method of communicating services and customizing behaviors and interfaces for services invocations through a plurality of terminals interfaced to the Internet, comprising the steps of:

transmitting, by a requesting user through one of said plurality of terminals, a request for a necessary service including an identifier (ID) for identifying a terminal type of the one of said plurality of terminals;

receiving, by a Service Enabling server connected to the Internet, the request, wherein each of said plurality of terminals are configured to independently access the Service Enabling server;

upon receiving the request by the Service Enabling server, selecting, by the Service Enabling server, a necessary service requested by the requesting user;

determining a terminal type of the one of the plurality of terminals used by the requesting user from a user profile of the requesting user stored on the Service Enabling server based on the ID, the user profile identifying preferences and terminal types used by the requesting user;

changing a form of the information relating to the necessary service that is output by the necessary service to a form that is compatible with the determined terminal type of at least one terminal of the requesting user, wherein the form that is compatible with the determined terminal type is determined from terminal capability files stored on the Service Enabling server, the terminal capability files including data representing features and profiles of various different terminals, wherein said step of transmitting comprises buffering information, said step of buffering comprising sending the request to the Service Enabling server from one of said plurality of terminals, sending from the Service Enabling server at least a start of a message corresponding to the request, and placing a mark in the Service Enabling server at an end of the message to indicate that the message is continued in a next message to be sent from the Service Enabling server, if further requested within a time limit.

43. A method of communicating services and customizing behaviors and interfaces for services invocations through a plurality of terminals interfaced to the Internet, comprising the steps of:

transmitting, by a requesting user through one of said plurality of terminals, a request for a necessary service including an identifier (ID) for identifying a terminal type of the one of said plurality of terminals;

receiving, by a Service Enabling server connected to the Internet, the request, wherein each of said plurality of terminals are configured to independently access the Service Enabling server;

upon receiving the request by the Service Enabling server, selecting, by the Service Enabling server, a necessary service requested by the requesting user;

determining a terminal type of the one of the plurality of terminals used by the requesting user from a user profile of the requesting user stored on the Service Enabling server based on the ID, the user profile identifying preferences and terminal types used by the requesting user;

changing a form of the information relating to the necessary service that is output by the necessary service to a form that is compatible with the determined terminal type of at least one terminal of the requesting user, wherein the form that is compatible with the determined terminal type is determined from terminal capability files stored on the Service Enabling server, the terminal capability files including data representing features and profiles of various different terminals, wherein the Internet includes a service-providing server, said method further comprising the step of performing session management including the sub-steps of:

accessing an application in the service-providing server from a first terminal of the plurality of terminals to establish a session;

maintaining the session in the service providing server;

identifying a user requesting access to the session and the service-providing server from a second terminal of the plurality of terminals;

joining the user from the second terminal to the session;

converting the protocols from the first terminal to the second terminal to continue the session; and terminating access to the session from the first terminal.

44. A method of communicating services and customizing behaviors and interfaces for services invocations through a plurality of terminals interfaced to the Internet, comprising the steps of:

- transmitting, by a requesting user through one of said plurality of terminals, a request for a necessary service including an identifier (ID) for identifying a terminal type of the one of said plurality of terminals;
- receiving, by a Service Enabling server connected to the Internet, the request, wherein each of said plurality of terminals are configured to independently access the Service Enabling server;
- upon receiving the request by the Service Enabling server, selecting, by the Service Enabling server, a necessary service requested by the requesting user;
- determining a terminal type of the one of the plurality of terminals used by the requesting user from a user profile of the requesting user stored on the Service Enabling server based on the ID, the user profile identifying preferences and terminal types used by the requesting user;
- changing a form of the information relating to the necessary service that is output by the necessary service to a form that is compatible with the determined terminal type of at least one terminal of the requesting user, wherein the form that is compatible with the determined terminal type is determined from terminal capability files stored on the Service Enabling server, the terminal capability files including data representing features and profiles of various different terminals, and
- further comprising the steps of requesting a service, by the requesting user, using a first terminal, and sending in response to the request, by the Service Enabling server, information related to the requested service to a second terminal of the user instead of the first terminal based on the user profile which defines the second terminal as an output terminal for that service.

* * * * *